US009479743B2

United States Patent
Damstra et al.

(10) Patent No.: US 9,479,743 B2
(45) Date of Patent: Oct. 25, 2016

(54) SINGLE LENS 3-D CAMERA (75) Inventors: Klaas Jan Damstra, Breda (NL);
Frank Van Der Weegen, Steenbergen (NL); Peter Centen, Goirle (NL); Ben Van Den Herik, Oosterhout (NL)

(73) Assignee: GVBB HOLDINGS S.A.R.L., Luxembourg (LU)

( * ) Notice: Subject to any disclaimer, the term of this patent is extended or adjusted under 35 U.S.C. 154(b) by 1115 days.

(21) Appl. No.: 13/150,988

(22) Filed: Jun. 1, 2011

(65) Prior Publication Data
US 2012/0307018 A1 Dec. 6, 2012

(51) Int. Cl.
H04N 13/02 (2006.01)
H04N 9/04 (2006.01)

(52) U.S. Cl.
CPC .......... *H04N 9/045* (2013.01); *H04N 13/0217* (2013.01)

(58) Field of Classification Search
CPC ...................... H04N 13/0207; H04N 13/0217
USPC ...................................... 348/49, 362; 396/63
See application file for complete search history.

(56) References Cited

U.S. PATENT DOCUMENTS

| 2005/0140820 A1* | 6/2005 | Takeuchi | H04N 13/021 348/362 |
| 2009/0290039 A1* | 11/2009 | Kanamori | H04N 9/045 348/222.1 |
| 2011/0018974 A1* | 1/2011 | Wang | H04N 13/0214 348/49 |
| 2011/0033177 A1* | 2/2011 | Kuroki | G03B 7/00 396/63 |
| 2011/0158504 A1* | 6/2011 | Turner | H04N 13/026 382/154 |

FOREIGN PATENT DOCUMENTS

| EP | 0501718 A | 9/1992 |
| JP | 62217790 A | 9/1987 |

OTHER PUBLICATIONS

Kalyjian et al., "Integrated High Resolution Focal-Plane Polarization Imager", Advances in Instrumentation and Control, Instrument Society of America, Research Triangle Park, US, vol. 2, No. Part 02, Jan. 1, 1998, pp. 9-17, XP000875212.
Notification of Transmittal of International Search Report and the Written Opinion of the International Searching Authority, or the Declaration, International Search Report, and Written Opinion in International Application No. PCT/IB2012/001152 mailed Sep. 14, 2012.
Abstract of JP 62217790 dated Sep. 25, 1987.
International Publication No. WO2012/164392A1 dated Dec. 6, 2012 re PCT Application No. PCT/IB2012/001152.
Office Action in corresponding EP Application No. 12743767.1 mailed Aug. 2, 2016.

* cited by examiner

*Primary Examiner* — Rowina Cattungal
(74) *Attorney, Agent, or Firm* — Arent Fox LLP (57) ABSTRACT

A camera includes a lens to receive an optical image from two viewing angles. A filter converts the optical image into two orthogonally polarized images, each orthogonally polarized image corresponding to a different one of the viewing angles. An image detector detects the two orthogonally polarized images in a single frame. An image processor decodes the two orthogonally polarized images in the single frame into two video signals corresponding to the two viewing angles. A method of imaging includes receiving an optical image from two viewing angles through a single lens, converting the optical image into two orthogonally polarized images, each polarized image corresponding to a different viewing angle, distinguishably detecting the two orthogonally polarized images in a single frame, and decoding the two orthogonally polarized images in the single frame into two video signals corresponding to the two viewing angles.

30 Claims, 5 Drawing Sheets

SINGLE LENS 3-D CAMERA

BACKGROUND

1. Field

This disclosure relates generally to video cameras, and more particularly to 3-D cameras.

2. Background

A number of approaches have been developed for 3-D image capture. These technologies typically seek to achieve stereoscopic images or a 2-D image plus a depth-map. Approaches may include a single camera or more than one camera. The use of two cameras or the use of two sets of lens systems to achieve 3-D parallax may impact the cost, complexity and bulkiness of such imaging systems. In addition, where two or more camera or optical beam systems are used, spatial tracking and alignment must be taken into account.

SUMMARY

In an aspect of the disclosure, a method of imaging includes receiving an optical image from two viewing angles, converting the optical image into two orthogonally polarized images, where each of the orthogonally polarized images correspond to a different one of the viewing angles, distinguishably detecting in an image detector the two orthogonally polarized images in a single frame, and decoding in an image processor the two orthogonally polarized images in the single frame into two video signals corresponding to the two viewing angles.

In an aspect of the disclosure, a camera includes a lens configured to receive an optical image from two viewing angles. A filter is configured to convert the optical image into two orthogonally polarized images, where each of the orthogonally polarized images corresponds to a different one of the viewing angles. An image detector is configured to distinguishably detect the two orthogonally polarized images in a single frame. An image processor is configured to decode the two orthogonally polarized images in the single frame into two video signals corresponding to the two viewing angles.

In an aspect of the disclosure, a camera includes a means for receiving light rays from a scene from two viewing angles through a single lens, a means for polarizing the light rays from the two viewing angles into two orthogonally polarized portions, means for distinguishably imaging the two orthogonally polarized portions of the light rays in a single frame on the basis of the orthogonal polarization of the two portions, and means for decoding the two images from the single frame into signals corresponding to images from the two viewing angles.

In an aspect of the disclosure, a camera includes a lens configured to admit light rays from a scene, the lens having a left portion and a right portion, where the left and right portions have the same correspondence as a viewer's left eye and right eye, a pair of orthogonal polarizing filters corresponding to the left and right lens portions arranged with the lens to bifurcate the light rays into a left group and a right group of two orthogonally polarized groups of rays, an image detector configured to distinguishably detect the two orthogonally polarized images in a single frame on the basis of the pair of orthogonal polarizing filters, and an image processor configured to decode the two orthogonally polarized images in the single frame into video signals corresponding to the light rays admitted to the left portion and right portion of the lens.

In an aspect of the disclosure, a machine-readable medium comprising instructions executable by a processor, the instructions comprise code for analyzing a frame of image data as a data stream from a plurality of pixel sensor elements of an image detector; referring to a lookup table to associate each pixel sensor element with one of two orthogonal states of polarizations; decoding the frame of image data to provide two data streams corresponding to each of the two polarizations; and constructing two synchronized output image frames of data on the basis of the polarizations In an aspect of the disclosure, a camera includes means for receiving an optical image from two viewing angles through a single lens, means for converting the optical image into two orthogonally polarized images, where each of the orthogonally polarized images correspond to a different one of the viewing angles, means for distinguishably detecting the two orthogonally polarized images, and means for decoding the two orthogonally polarized images in the single frame into two video signals corresponding to the two viewing angles.

It is understood that other aspects of the invention will become readily apparent to those skilled in the art from the following detailed description, wherein various aspects of the invention are shown and described by way of illustration. As will be realized, the invention is capable of other and different configurations and implementations and its several details are capable of modification in various other respects, all without departing from the scope of this invention. Accordingly, the drawings and detailed description are to be regarded as illustrative in nature and not as restrictive.

BRIEF DESCRIPTION OF THE DRAWINGS

Various aspects of 3-D image capture are illustrated by way of example, and not by way of limitation, in the accompanying drawings, in which like references indicate similar elements, and in which.

DETAILED DESCRIPTION

The detailed description set forth below in connection with the appended drawings is intended as a description of various embodiments of the present invention. The invention, however, may be embodied in many different forms and should not be construed as limited to the various concepts presented throughout this disclosure. Rather, these concepts are provided so that this disclosure will be thorough and complete, and will fully convey the scope of the present invention to those skilled in the art. The detailed description includes specific details for the purpose of providing a thorough understanding of the invention. However, it will be apparent to those skilled in the art that the invention may be practiced without these specific details. In some instances, well-known structures and components are omitted in order to avoid obscuring the concepts of the invention.

Various concepts will now be presented with reference to a 3-D camera. The 3-D camera may be a stand-alone system, or it may be incorporated in any number of systems that may include image functionality, such as cellular phones, digital cameras, personal digital assistants, video games, computers, medical imaging instrumentation, etc. Furthermore, as those skilled in the art will readily appreciate, these concepts may be extended to other devices for 3-D image capture. By way of example, various concepts presented throughout this disclosure may be extended to acoustic imaging, electron microscope imaging, x-ray imaging, proton or other charged particle imaging, or any other suitable device, where the acoustic, electron, photon, x-ray or particle beam used in imaging is capable of polarization and a detector is capable of polarization dependent detection of such beams. Accordingly, any reference to a specific optical camera or other device is intended to illustrate the various aspects of the present invention, with the understanding that these aspects have a wide range of application, using wide ranging forms of polarizable energy and particles for imaging.

Various aspects of an apparatus and method of using will be presented for 3-D image capture to obtain in a single image frame, utilizing filtering, a left and right image each having different views of an object scene. Signal processing, either in the image detector or a subsequent image processing component may be used to decode the frame to provide the left and right images separately.

In human vision, light rays entering the left eye and right eye of a viewer coming from a different view of a scene. This parallax is mimicked in a 3-D camera using a single camera lens system. Advantage may be taken of a lens system having a specified aperture by dividing the aperture into left and right portions, or sub-apertures. The scene corresponding to each portion may be filtered with a corresponding polarizer, where the two polarizers are orthogonal to each other. Thus, the lens may be divided to provide two fields of view (e.g., as seen through the left and right portions of the lens) of a scene according to each of the two orthogonal polarizers. An imaging detector element, such as a CMOS array, CCD array, phototransistor array, or equivalents, may be modified to receive both orthogonally polarized images in a single frame, as described below, where the two images may be decoded and separated.

For ease of description, a lens may be described as having a left portion and a right portion which may be equal halves, and which are therefore defined by a virtual boundary down a vertical the center of the lens as viewed looking toward a scene being imaged. Other bifurcations of the lens than equal portions may be considered to be within the scope of this disclosure. The lens may be a single lens, or a compound lens, which is common in the art of camera optics. Two polarizers may be referred to as orthogonally polarized, whether the polarization is linear for each polarizer, in which case the polarizations are arranged at 90° to each other, or circular, in which case the polarizations are "left" and "right" circular polarizations. More generally, we may refer to the two types of polarization filters as "a"-type or "b"-type. Further transmission of "a" polarized light will substantially pass through any subsequent "a"-type filter, and be blocked by a "b"-type filter and similarly, transmission of "b" polarized light will substantially pass through any subsequent "h"-type filter, and be blocked by an "a"-type filter.

Figure 1:
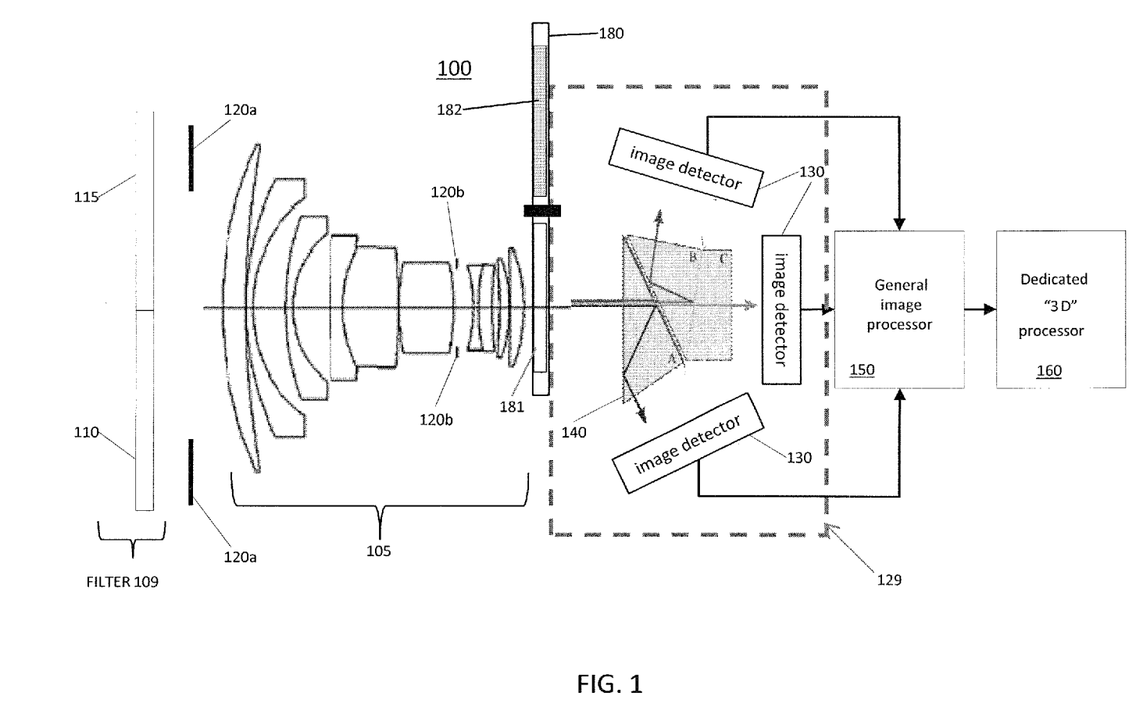
FIG. 1 is a conceptual diagram of a first embodiment of a 3-D digital imaging camera in accordance with the disclosure.

Referring to FIG. 1, a camera 100 includes a lens 105. The lens 105 may be a single lens or a compound lens, as shown in FIG. 1. A filter 109, comprising a left polarizer 110 and a right polarizer 115 may be placed at any of several locations within the camera 100. For example, the filter 109 may be placed directly adjacent to the lens 105, or directly adjacent to an iris aperture 120a, as shown in FIG. 1. However, there may be other locations for the filter that are acceptable, and image reversal may occur in the optical system, depending on details of design, and the nomenclature defined herein may be revised accordingly.

Additionally, there may be other locations for the iris aperture, such as iris aperture 120b, as shown in FIG. 1, where the lens 105 is a compound lens, and the iris aperture 120b is located within the compound lens.

A filter wheel 180 may be located in the optical train between the filter 109 and any subsequent optical components. The filter wheel includes at least a clear aperture or transparent window 181, which does not affect the 3-D operation of the camera 100. The filter wheel 180 may also include a phase retardation plate 182 whose function will be described below. The filter wheel may be rotated to position either the transparent window 181 or the phase retardation plate 182 in the optical path of the camera, as desired.

The lens 105 produces a focused image at an image focal-plane of an imaging detector 129, which includes an image detector element 130 that may be placed at the image focal-plane of the light rays emerging from the lens 105. The image detector element 130 may be, for example, a CMOS, CCD, phototransistor, or other type of imaging device comprising an array of pixel sensors. The image detector element 130 may be a color image detector, in which case a single image detector element 130 may be sufficient. The image detector element 130 may include additional filtering for selective polarization, as described below.

Optionally, the imaging detector 129 may include a color beam splitter 140 that may be placed in a path following the lens 105 configured to split light rays emerging from the lens 105 into a plurality of complementary colors. Conventionally, for example, light may be split into red, blue and green, and three monochrome images may be detected by three separate image detector elements 130 placed at the image focal-planes defined and arranged according to the lens 105 and the design of the color beam splitter 140. Thus, each image detector element 130 receives a monochrome image of a specified color. In the embodiment of multiple detectors, such as described above, maintaining spatial registration of the multiple images when combined (or superimposed) yields a single full color image.

The image detector elements 130 may provide input signals to a general image processor 150, which is concerned with processing chroma, luminance, etc., related to standard image processing that ultimately results in a stream of image output signals that constitute frames of a video stream. For the convenience of further discussion, it will be assumed that the camera 100 comprises a single image detector element 130, and therefore, without further loss of generality, no color beam splitter 140 is used or further discussed.

In one embodiment of the camera 100, the output signals from the general image processor 150 may be further processed in accordance with properties of the image detector element 130 to be described below to enable generation of signals incorporating 3-D properties.

Figure 2:
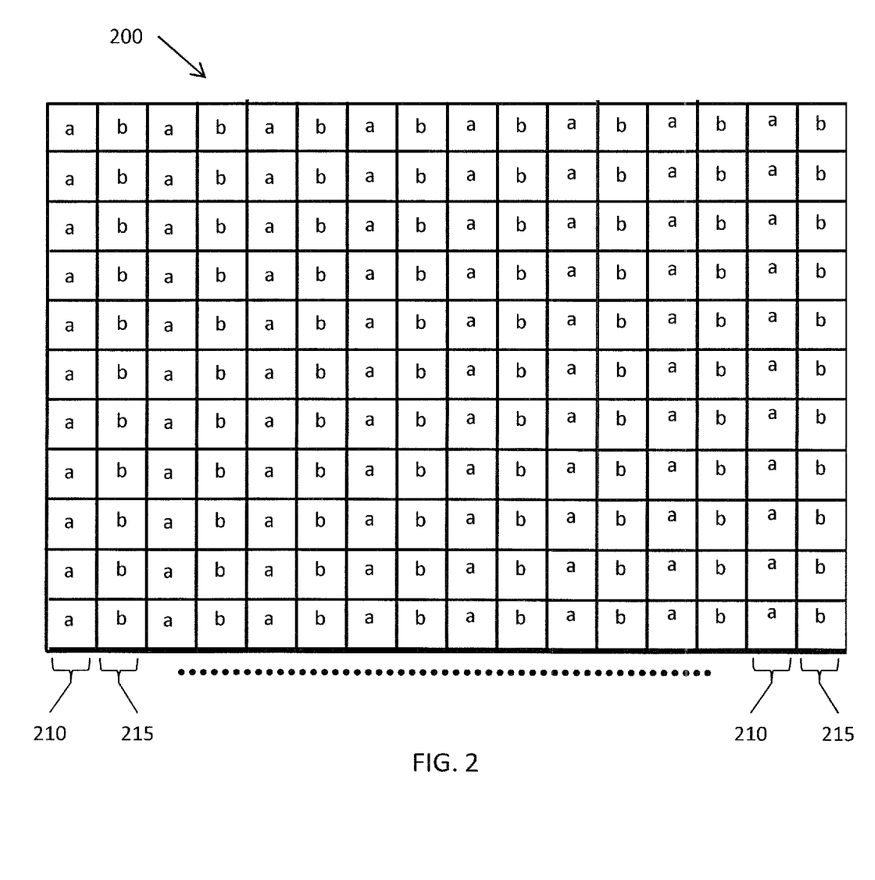
FIG. 2 is a conceptual diagram of embodiment of a portion of a dual polarization imaging detector in accordance with the disclosure.

The image detector element 130, which may include a conventional pixel sensor array 200, or pixel array 200 (either color or monochrome), further includes a combination polarizing filter, and the image detector will now be referred to as a 3-D image detector element 130. FIG. 2 is a schematic representation of a portion of the pixel array 200 of a 3-D imaging detector element 130. In one embodiment, the combination polarizing filter includes alternating segments (e.g., as columns, rows or a "checkerboard") of orthogonally polarizing filter elements 210, 215 placed in front of one or more pixels on a face of the 3-D image detector 130. One polarization may be labeled "a," and the orthogonal polarization may be labeled "b"; that is, alternating segments of linear polarizers a and b arranged at 90° to each other, or alternating segments of left and right circular polarizers a and b, corresponding to the type of polarization a or b employed in the left and right polarizers 110 and 115 are formed and aligned on the face of the 3-D image detector 130. In this embodiment, as shown in FIG. 2, each polarizing filter element 210, 215 may extend over an entire vertical column of pixels, for example, where the width of the column may extend over one or more individual pixel elements, which may be referred to as a cell. For example, in a full color imaged detector, the column polarizing filter elements 210, 215 may have a width equal to one or more of a Bayer mosaic cell, which is a configuration of red, green and blue filtered pixel elements well known in the art. Other cell configurations of color filtered pixels are also well known in the art and may be used accordingly. For highest resolution, the segment width may be only one cell wide. In a monochrome detector, as described above, the cell may be only one pixel wide, and each segment of polarizing filter elements 210, 215 may be one or more pixels wide. Alternatively, the segments of polarizing filter elements 210, 215 may be arranged as horizontal rows. Alternatively the segments of polarizing filter elements 210, 215 may be arranged as alternating checkerboard "squares" or "patches."

Each set of same-polarized segments of polarizing filter elements 210 or 215 defines a sub-array of the 3-D image detector 130 that will only pass light of polarization corresponding to the polarization of polarizers 110 or 115. The two sub-arrays are spatially interleaved (in vertical columns, horizontal rows, or checkerboard). Therefore, each sub-array will pass light arriving from either the left half or right portion of the lens, according to the same corresponding polarization of the polarizers 110 and 115. The 3-D image detector 130 therefore receives two images, i.e., one from each of the left and right portions of the lens 105, providing parallax image information from two (left and right) viewing angles. The degree of parallax is at least in part determined by the diameter of the lens and an aperture of the iris aperture.

The signals output from the general image processor 150 may then be further processed by a 3-D processor 160, which may be a separate physical unit, or a subsystem within the general image processor 150, providing the additional ability to process the images from the 3-D image detector element 130. The functionality of the dedicated 3-D processor 160 depends on knowledge of the relationship between the two orthogonally polarized sub-arrays of the elements 210, 215 of the imaging sensor array on the 3-D image detector element 130 to distinguishably receive two orthogonally polarized images in a single frame. That relationship includes knowing the number of segments and location of each alternating type of polarizer across the span of the imaging sensor array, and how many pixel cells are spanned by each polarizing segment a or b. The 3-D processor 160 may then decode two interleaved images having orthogonal polarization into two signals corresponding to two frames of a scene viewed simultaneously from two viewing angles, providing a "left eye view" image and a "right eye view" image, i.e., two images obtained from two viewing angles through the single lens 105.

Figure 3:
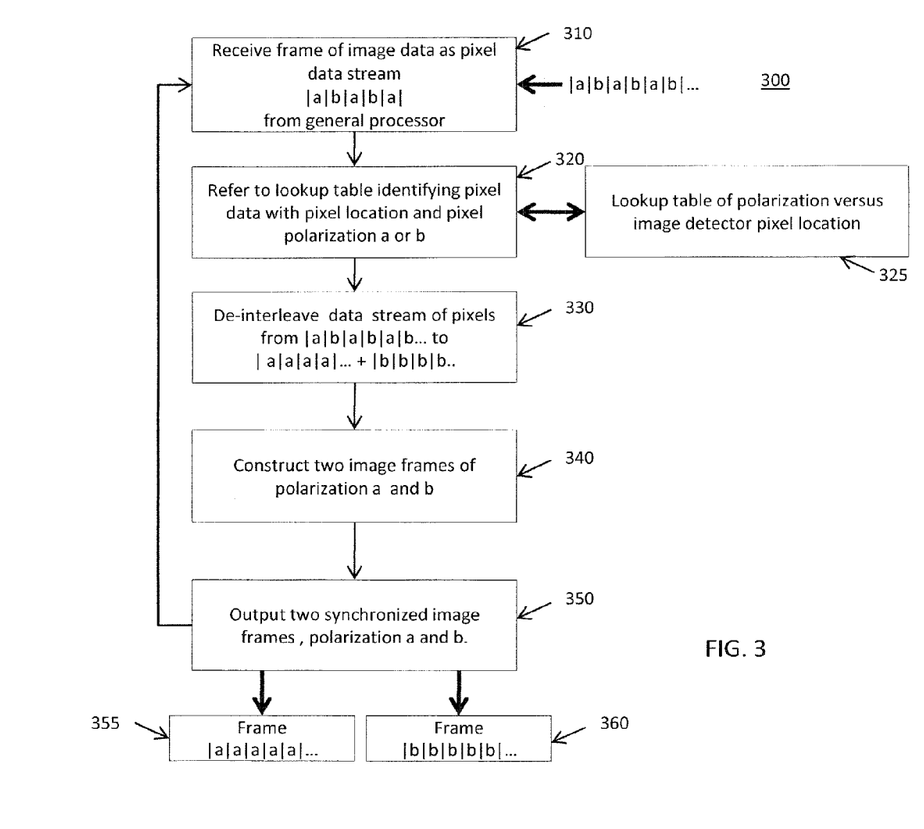
FIG. 3 is a block diagram of an embodiment of a method to decode two images as received through a single lens camera in accordance with the disclosure.

FIG. 3 illustrates a method 300 of decoding in the 3-D processor the signals received from the general image processor 150 to provide the two images of the scene as viewed from two viewing angles. First, in block 310 the 3-D processor receives a data frame from the general image processor 150, in which a string of data contains typical parameters for each pixel in the image detector 130. Typical parameters may include at least chroma and luminance for each pixel. Since each pixel lies beneath a polarizing filter of type "a" or type "b," it will receive light that passed through the camera only from left polarizer 110 or right polarizer 115, but not both, depending on whether the polarization of polarizers 110 and 115 are "a" or "b" type.

At this point, it is not known what the polarization of light falling on the image detector is. In fact, because the two images are mixed in the focal plane, and both polarizations of light fall on each pixel. However, because of the nature of the arrangement of alternating orthogonally polarizing filter elements 210, 215 of "a" and "b" polarization, light of only one type or the other is detected at the pixel sensor. Thus, without the general image processor 150 being aware of the polarization being detected at each pixel or pixels (e.g., column, row or patch) the light detected at the image detector element 130, after passing through the orthogonally polarizing filter elements 210, 215, is now light that is of "a" or "b" type polarization.

In block 320 the 3-D processor 160 refers to a lookup table 325 that identifies the pixel as being the recipient of "a" or "b" type polarization. Based on this information, in block 330 the 3-D processor can de-interleave the two images of orthogonal polarization and, in block 340, construct two image frames of data that corresponds to an image of either "a" polarization (represented as a stream of data packets {|a|a|a|a|a|a| . . . } or "b" polarization (represented as a stream of data packets {|b|b|b|b|b|b| . . . }. In block 350 the 3-D processor may output the two image frames 355 and 360 synchronized so that the two images may be viewed substantially simultaneously and separately by each eye of the viewer. Since each image represents a scene as viewed through separate portions of the lens, as determined by the spatial separation of the polarizers 110 and 115, the two images are views of the scene from different viewing angles. An appropriate receiver system may decode the two images from the stream of data packets for projection and viewing.

Figure 4:
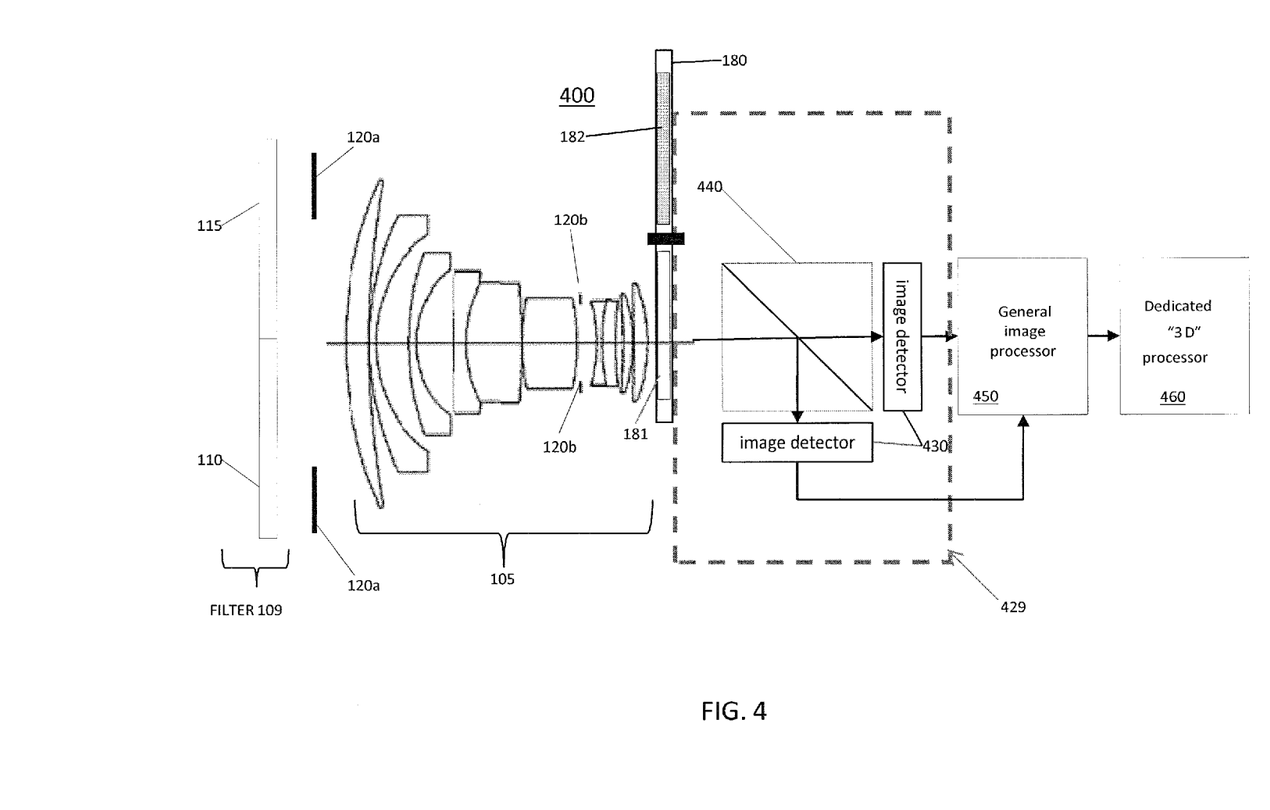
FIG. 4 is a conceptual diagram of a second embodiment of a 3-D digital imaging camera in accordance with the disclosure.

FIG. 4 is a conceptual diagram of a second embodiment of a 3-D digital imaging camera 400. In most respects, camera 400 is identical to camera 100 except for the features described below.

In place of the imaging detector 129 as shown in FIG. 1, an imaging detector 429 may include a polarizing beam splitter 440 that may be placed in a path following the lens 105. The polarizing beam splitter may be configured to split light rays emerging from the lens 105 into the two orthogonal polarizations corresponding to the polarization of the left polarizer 110 and a right polarizer 115. An image corresponding to the polarization of polarizer 110 is directed to one image detector element 430, and the image corresponding the polarization of polarizer 115 is directed to a second image detector element 430. The image detector elements 430 are located at the image plane, therefore the optical path dimensions of the polarizing beam splitter 440, which may differ from, for example, the color beam splitter 140, is taken into account in positioning the two image detector elements 430. Thus, each one of the image detector elements 430 receives an image of the scene as viewed from the viewing angle corresponding to light rays passing through polarizer 110 or polarizer 115.

The image detector elements 430 differ from the image detector elements 130 in that there is no combination polarizing filter comprising alternating segments (e.g., columns, rows, or patches) of orthogonal polarization on the face of the image detector elements 430, because the two polarized images are directed by the polarizing beam splitter 440 to the two separate image detector elements 430.

In the embodiment of two detectors receiving two spatially separated views, each corresponding to an orthogonal polarization, such as described above, the output of the two image detector elements 430 may be processed and combined into a coded signal by an appropriate general image processor 450 substantially similar to general image processor 150 to provide a signal to a 3-D processor 460. The 3-D processor 460, which may be a separate physical unit, or a subsystem within the general image processor 450, provides the additional ability to process the images from the image detector elements 430 for 3-D imaging. The functionality of the dedicated 3-D processor 460 does not have to depend on a knowledge of any interlaced orthogonally polarized sub-arrays, as in the embodiment described above, because there are no interlaced sub-arrays, and each of the image detector elements 430 receives a single image of one polarization only.

The general image processor 450 has a separate input to receive the output of each image detector element 430. The signals output from the general image processor 450 may then be further processed by the 3-D processor 460, where the processing requirements may be simpler than for the embodiment described above, in which both polarizations are received at each of the image detector elements 130. In the particular embodiment described herein, it may be sufficient for the 3-D processor 460 to encode onto a single output data stream two alternatingly interleave frames of images from each of the two correspondingly orthogonally polarized parallax images received by the two image detector element 430. An appropriate receiver system may decode the two images from the stream of data packets for projection and viewing.

In a further aspect of the disclosure, the embodiments described with reference to FIGS. 1 and 4 may be further adapted to provide variable image convergence, or "toe-in." Increasing the image convergence give the effect of projecting a viewed image farther in front of the screen, and closer to the viewing observer, thus dramatically enhancing the effect of 3-D depth perception. The following description is presented with reference to the embodiment in FIG. 4, although the same principals of convergence may be applied equally to the embodiment of FIG. 1, both for color mosaic image detector elements and image detector elements receiving monochromatic images via the color beam splitter 140.

Figure 5:
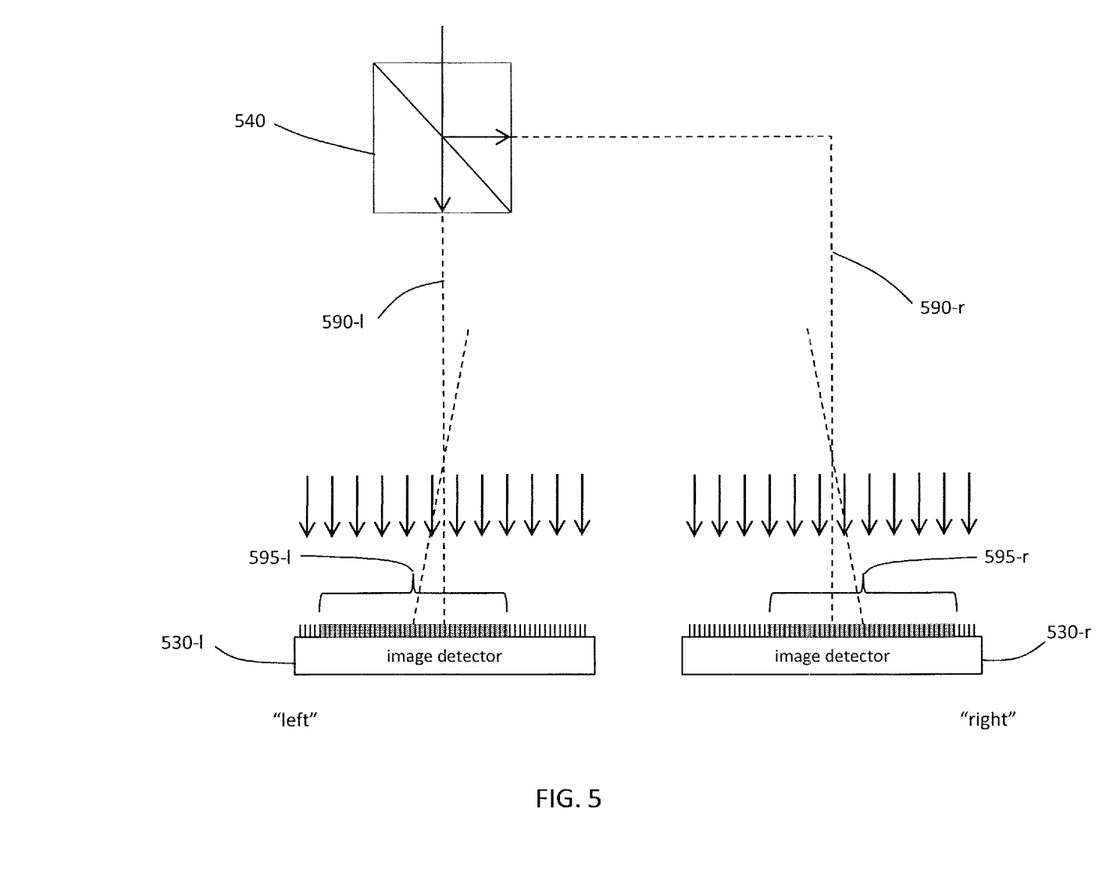
FIG. 5 is a conceptual diagram of illustrating variable convergence in a 3-D digital imaging camera in accordance with the disclosure.

FIG. 5 shows two image detector elements **530-*l*, 530-*r* conceptually arranged side by side to more easily describe the convergence effect. In practice, the two detector elements 530 may be arranged physically as in FIG. 4 or as in FIG. 1. Each image detector element 530-*l*, 530-*r* may be arranged symmetrically with respect to the output axis 590-*l* ("left") or 590-*r*** ("right").

The arrangement of all optical elements preceding and conducting light rays to the detector element **530-*l*, 530-*r* are configured to produce an image at each image detector element 530-*l*, 530-*r* that fills the array of pixel sensors. (Because the human eyes are arranged horizontally, 3-D depth perception results from parallax in the horizontal direction. No vertical parallax is considered. However, a 3-D processor (not shown, but substantially represented by 3-D processor 460 of FIG. 4) may, in addition to functions described above in connection with FIGS. 1 and 4, may process the data stream to output in a channel corresponding to a "left-eye" view a frame of data that is a subset of the full frame, and is "left-shifted" relative to the center of the full image. Thus, the center of the pixel subset read out to the general processor 450 and 3-D processor 460 with respect to the output axis 590-*l* is shifted to the left. Similarly, the data stream output from the "right" detector element 530-*r* may be processed by the 3-D processor 460 to output in a channel corresponding to a "right-eye" view a frame of data that is a subset of the full frame, and is "right-shifted" relative to the center of the full image. Thus, the center of the pixel subset with respect to the output axis 590-*r*** is shifted to the right. By spreading the effective separation of the center of the two images farther apart in this way, a person viewing these images separately with each eye will perceive increased parallax and convergence of the two images, giving the impression of a perceived closer object.

The 3-D processor 460 may perform this shifting of the "left" and "right" image within the output data frame dynamically to intentionally alter the perceived field depth on a temporal basis, or the convergence may be determined statically for a constant shift of the perceived image field. In the former case, The 3-D processor 460 may make this convergence alteration on the basis of data provided corresponding to scene information, such as autofocus, manual focus, editing input, or other mechanical or electronic controls.

Referring again to FIG. 1, the phase retardation plate 182 may be used to restore a normal 2-D imagery detection to the image detector 129. In the case where polarizers 110 and 115 are orthogonal linear polarizers, the phase retardation plate 182 may be a single linear polarizer oriented at ±45 degrees to each of the polarizers 110, 115. The result is that light further transmitted is, in addition to being partially attenuated, now polarized at 45 degrees, and is therefore detected at all pixels of the image detector element 130, since the light now has components of both polarizations corresponding to polarizing filter elements 210, 215. The result is the same as if (apart from the attenuated intensity resulting from light passing through polarizers successively at 45 degrees to the light polarization) the lens images a single view on the image detector element 130 with maximum pixel resolution.

In the case where the polarizers 110, 115 and polarizing filter elements 210, 215 are left and right circular polarizers, respectively, the phase plate 182 may be a multi-wave plate or an achromatic wave plate, with a fast axis at ±45 degrees to the fast axes of the polarizers 110, 115 and polarizing filter elements 210, 215, which the converts the transiting light from circular polarized light to varying degrees of elliptical, linear polarization and circular polarization. Therefore, the polarizing filter elements 210, 215 become at least partially transparent to both groups of the originally circular left and right polarized light. On the basis of the known position of the filter wheel 180, the 3-D processor may process the image from the image detector element accordingly as one image, for example with twice the pixel resolution, or simply pass the image data to an output as a single image, with appropriate adjustment for pixel resolution.

A similar arrangement may be implemented in the camera 400 to recover both orthogonally polarized images from the two views as seen through each portion of the lens 105 to a single 2-D image without parallax.

It is understood that any specific order or hierarchy of steps described in this method is being presented to provide an example of the operation of the 3-D processor in a camera. Based upon design preferences, it is understood that the specific order or hierarchy of steps may be rearranged. In addition, it is understood that any step may be omitted and/or additional steps not disclosed herein can be included, all while remaining within the scope of the invention.

Forming segments on the surface of an image detector, wherein alternating or different segments have alternating orthogonal polarizing layers over segments of one or more pixels is well known in the art. Conventional photolithographic methods may be used to form two sub-arrays of alternating polarization segments. The two sub-arrays may be formed directly on the pixel array, or they may be formed separately and aligned to the pixel array afterwards.

The various electronic components of the camera described thus far may be implemented as hardware, software, or combinations of both. Whether such components are implemented as hardware or software depends upon the particular application and design constraints imposed on the overall system. Skilled artisans may implement the described components in varying ways for each particular application. By way of example, each component, or any combination of components, may be implemented with one or more microprocessors, microcontrollers, digital signal processors (DSPs), field programmable gate arrays (FPGAs), programmable logic devices (PLDs), controllers, state machines, gated logic, discrete hardware components, or any other suitable circuits that can perform the various functionalities described throughout this disclosure, or any combination thereof.

Various components (e.g., microprocessor) may be configured to execute software. Software shall be construed broadly to mean instructions, data, or any combination thereof, whether referred to as software, firmware, middleware, microcode, hardware description language, or otherwise. The software may be stored on machine-readable media. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium for storing non-transient data, or any combination thereof.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of imaging comprising;
   receiving an optical image from two viewing angles within a single lens;
   converting the optical image into two orthogonally polarized images, each of the orthogonally polarized images corresponding to a different one of the two viewing angles;
   distinguishably detecting the two orthogonally polarized images in a single frame, using a detector and a polarizing filter comprising alternating segments of a first type of polarization and a second type of polarization orthogonal to the first type of polarization;
   movably positioning a phase retardation plate between the lens and the detector to selectively restore 2D image detection; and
   decoding the two orthogonally polarized images in the single frame into two video signals corresponding to the two viewing angles using a general image processor to form a 3D image when the phase retardation plate is moved out of position between the lens filter and the image detector, wherein the decoding comprises determining for each pixel of the detector which of the two types of polarization apply and constructing two separates images from the received optical image and decoding a single video signal to form a 2D image when the phase retardation plate is moved into position between the lens and the image detector.

2. The method of claim 1, wherein the optical image is converted by:
   polarizing the optical image from a first one of the viewing angles with a first polarizing filter; and
   polarizing the optical image from a second one of the viewing angles with a second polarizing filter polarized orthogonally to the first polarizing filter.

3. The method of claim 2, wherein the first and second orthogonally polarized filters are in front. of the lens.

4. The method of claim 2, wherein the phase retardation plate comprises a single linear polarizer oriented at a 45 degree angle to each of the first polarizing filter and the second polarizing filter.

5. The method of claim 4, wherein when the phase retardation plate is moved into position between the lens and the detector, the two orthogonally polarized images are additionally polarized at the 45 degree angle such that the detector detects a single image.

6. The method of claim 1, wherein the optical image is converted by transmitting a portion of the image corresponding to each viewing angle through one of a pair of orthogonally polarized filters.

7. The method of claim 6, where the optical image comprises one or more color images, the method further comprising:
   separating the one or more color images into one or more complementary monochrome images; and
   directing the separated complementary monochrome images to corresponding separate image detector elements.

8. The method of claim 1, wherein the two orthogonally polarized images are distinguishably detected using an image detector array comprising an image array filter wherein adjacent segments at specified locations have spatially alternating orthogonal polarizations, wherein the orthogonally polarized images are decoded according to polarization on the basis of the locations of the spatially alternating orthogonal polarization filter segments.

9. The method of claim 8, wherein the two orthogonally polarized images are decoded according to polarization on the basis of the locations of the spatially alternating orthogonal polarization filter segments.

10. The method of claim 9, wherein the two orthogonally polarized images are decoded by constructing two synchronized output signals corresponding to horizontal subsets of the two orthogonally polarized images.

11. The method of claim 1, the two orthogonally polarized images are decoded by constructing two synchronized output signals corresponding to the two orthogonally polarized images.

12. The method of claim 1, further comprising:
separating the two orthogonally polarized images with a polarizing beam splitter; and
detecting the separated orthogonally polarized images; and
constructing two synchronized output signals corresponding to the two orthogonally polarized images.

13. The method of claim 12, further comprising:
constructing two synchronized output signals corresponding to each of the two orthogonally polarized images that are a horizontal subset of the corresponding polarized images, wherein the two synchronized output signals represent images with greater parallax than the polarized images from which the subsets are constructed.

14. The method of claim 1, wherein the optical image is converted by a left circular polarizer and a right circular polarizer, and wherein the phase retardation plate comprises a multi-wave plate having an axis at 45 degrees to an axis of each of the left circular polarizer and the right circular polarizer.

15. The method of claim 1, further comprising:
processing the optical image at the detector as a single image or as two separate images based on the position of the phase retardation plate.

16. A camera comprising:
a lens configured to receive an optical image from two viewing angles;
a first filter configured to convert the optical image into two orthogonally polarized images, each of the orthogonally polarized images corresponding to a different one of the viewing angles;
an image detector configured to distinguishably detect the two orthogonally polarized images in a single frame;
an image detector filter disposed between the first filter and the image detector, the image detector filter comprising alternating segments of a first type of polarization and a second type of polarization orthogonal to the first type of polarization;
a phase retardation plate movably positioned to restore 2D image detection when the phase retardation plate is positioned between the first filter and the image detector; and
an image processor configured to:
decode the two orthogonally polarized images in the single frame into two video signals corresponding to the two viewing angles to fonn a 3D image when the phase retardation plate is moved out of position between the lens filter and the image detector, wherein the decoding comprises determining for each pixel of the detector which of the two types of polarization apply and constructing two separates images from the received optical image; and
decode a single video signal to form a 2D image when the phase retardation plate is moved into position between the lens and the image detector.

17. The camera of claim 16, wherein one of the polarized images corresponds to the optical image received by the lens from one of the viewing angles, and the other one of the polarized images corresponds to the optical image received by the lens from the other one of the viewing angles.

18. The camera of claim 16, wherein the filter is in front of the lens.

19. The camera of claim 16, further comprising an iris arranged with the filter, and wherein the filter comprises a pair of orthogonally polarized filters, and wherein the image detector comprises at least one CMOS array.

20. The camera of claim 16, further comprising a color separating beam splitter configured Co separate the optical image into a plurality of monochrome color images, and wherein the image detector comprises a corresponding plurality of image detector elements, each of the image detector elements being configured to receive a different one of the color images.

21. The camera of claim 16, wherein the image detector comprises at least one or more image detector elements each comprising an array having a plurality of sensor segments, wherein the image detector filter is configured such that each orthogonally polarized image is detected by a separate sub-array of the sensor segments for each of the image detector elements.

22. The camera of claim 16, wherein the phase retardation plate comprises at least one of a multi-wave plate and an achromatic wave plate having an axis at 45 degrees to an axis of the first filter.

23. The camera of claim 16, wherein the image processor is configured to pass the image data to an output as a single image, when the phase retardation plate is positioned between the first filter and the image detector.

24. The camera of claim 16, wherein the image processor is configured to spread an effective separation of the two separate images by adjusting left eye image data by left shifting the left eye image data relative to a center of the optical image and by adjusting right eye image data by right shifting the right eye image data relative to the center of the optical image.

25. The camera of claim 24, wherein the image processor is configured to dynamically spread the effective separation of the two separate images based on user control.

26. The camera of claim 24, wherein he image processor is configured to dynamically spread the effective separation of the two separate images according to at least one of scene information, autofocus, manual focus, editing input, and a control input.

27. A non-transitory computer readable storage medium comprising instructions executable by a processor, the instructions comprising code for:
analyzing a frame of image data as a data stream from a plurality of pixel sensor elements of an image detector;
associating each pixel sensor element with one of two orthogonal states of polarizations;
decoding the frame of image data using a general image processor to provide two data streams corresponding to each of the two polarizations, wherein decoding the frame of image data comprises determining for each pixel sensor element of the image detector which of the two orthogonal states of polarization apply;

constructing a single output image frame configured to form a 2D image a phase plate is used to adjust light rays detected at the pixel sensor elements; and constructing two synchronized output image frames of data configured to form a 3D image on the basis of the polarizations, when the phase plate is not used to adjust the light rays detected at the pixel sensor elements.

28. A camera comprising:

a lens configured to admit light rays from a scene, the lens having a left portion and a right portion, wherein the left and right portions have a same correspondence as a viewer's left eye and right eye;

a pair of orthogonal polarizing filters corresponding to the left and right lens portions arranged with the lens to bifurcate the light rays into a left group and a right group of two orthogonally polarized groups of rays;

an image detector configured to distinguishably detect the two orthogonally polarized images in a single frame on the basis of the pair of orthogonal polarizing filters;

an image detector filter disposed between the pair of polarizing filters and the image detector, the image detector filter comprising alternating segments of a first type of polarization and a second type of polarization orthogonal to the first type of polarization;

a phase retardation plate movably positioned to restore 2D image detection when the phase retardation plate is positioned between the pair of orthogonally polarizing filters and the image detector; and an image processor configured to:
  decode the two orthogonally polarized images in the single frame into video signals corresponding to the light rays admitted to the left portion and right portion of the lens to form a 3D image when the phase retardation plate is moved out of position between the lens and the image detector, wherein the decoding comprises determining for each pixel of the detector which of the two types of polarization apply and constructing two separates images from the received optical image; and
  decode a single video signal to form a 2D image when the phase retardation plate is moved into position between the lens and the image detector.

29. A camera comprising:

means for receiving an optical image from two viewing angles in a single lens;

means for converting the optical image into two orthogonally polarized images, each of the orthogonally polarized images corresponding to a different one of the viewing angles;

means for distinguishably detecting the two orthogonally polarized image, using a detector and a polarizing filter comprising alternating segments of a first type of polarization and a second type of polarization orthogonal to the first type of polarizations;

means for movably arranging a phase plate with respect to the pair of orthogonal polarizing filters, wherein the phase plate is movable to a position to receive the two groups of orthogonally polarized light rays and to convert each group of light rays to a group of light rays polarized with a mixture of the two orthogonal polarizations; and means for decoding the two orthogonally polarized images in the single frame into two video signals corresponding to the two viewing angles using a single general image processor to form a 3D image when the phase plate is moved out of position between the means for receiving and the means for detecting, wherein the decoding comprises determining for each pixel of the detector which of the two types of polarization apply and constructing two separates images from the received optical image and for decoding a single video signal to forma 2D image when the phase plate is moved into position between the means for receiving and the means for detecting.

30. A camera comprising:

a lens configured to admit light rays from a scene, the lens having a left portion and a right portion, wherein the left and right portions have a same correspondence as a viewer's left eye and right eye;

a pair of orthogonal polarizing filters corresponding to the left and right lens portions arranged with the lens to bifurcate the light rays into a left group and a right group of two orthogonally polarized groups of rays;

a phase plated movably arranged with respect to the pair of orthogonal polarizing filters, wherein the phase plate is movable to a position to receive the two groups of orthogonally polarized light rays and to convert each group of light rays to a group of light rays polarized with a mixture of the two orthogonal polarizations;

an image detector configured to detect from the group of light rays of mixed polarization as a single image on the basis of the arrangement of the phase plate; and an image processor configured to construct a single image frame based on the single image detected by the image detector when the phase plate is moved into position between the lens and the image detector to form a 2D image, and to construct two video signals to form a 3D image when the phase plate is moved out of position between the lens and the image detector, including determining whether each pixel of the image detector corresponds to the left group or the right group of orthogonally polarized groups of rays.

* * * * *